(12) United States Patent
Clark

(10) Patent No.: US 11,470,824 B2
(45) Date of Patent: Oct. 18, 2022

(54) HEXAGONAL NESTING BLOCK FOR SOLITARY TUNNEL NESTING BEES AND OTHER HYMENOPTERANS

(71) Applicant: Kimball Clark, Kaysville, UT (US)

(72) Inventor: Kimball Clark, Kaysville, UT (US)

( * ) Notice: Subject to any disclaimer, the term of this patent is extended or adjusted under 35 U.S.C. 154(b) by 0 days.

(21) Appl. No.: 17/198,246

(22) Filed: Mar. 11, 2021

(65) Prior Publication Data
US 2022/0287282 A1    Sep. 15, 2022

(51) Int. Cl.
*A01K 47/00* (2006.01)
*A01K 47/06* (2006.01)

(52) U.S. Cl.
CPC .............. *A01K 47/06* (2013.01); *A01K 47/00* (2013.01)

(58) Field of Classification Search
CPC ................................. A01K 47/00; A01K 47/06
USPC .................................................. 449/4, 26, 30
See application file for complete search history.

(56) References Cited

U.S. PATENT DOCUMENTS

| | | | | |
|---|---|---|---|---|
| 1,871,595 A | * | 8/1932 | Eldred .................... | A01K 47/06 449/30 |
| 3,191,199 A | * | 6/1965 | Barnes, Jr. ........... | A01K 67/033 449/4 |
| 3,267,497 A | * | 8/1966 | Dority ..................... | A01K 49/00 449/4 |
| 3,936,894 A | * | 2/1976 | Barber .................... | A01K 49/00 449/4 |
| 4,365,372 A | * | 12/1982 | Norman ................ | A01K 67/033 449/4 |
| 4,718,134 A | * | 1/1988 | Ashby .................... | A01K 57/00 449/28 |
| 4,983,139 A | * | 1/1991 | Kretschmann ......... | A01K 47/00 449/30 |
| 5,591,063 A | * | 1/1997 | McCarthy .............. | A01K 47/00 449/4 |
| 6,364,738 B1 | * | 4/2002 | Kendell ................. | A01K 47/00 449/29 |

(Continued)

FOREIGN PATENT DOCUMENTS

| | | | | |
|---|---|---|---|---|
| CN | 106942092 A | * | 7/2017 | ............. A01K 47/02 |
| KR | 200188667 Y1 | * | 7/2000 | |

(Continued)

OTHER PUBLICATIONS

English-language translation of KR 200188667 Y1 (Year: 2000).*
English-language translation of RU 190882 U1 (Year: 2019).*

*Primary Examiner* — Lisa L Tsang
(74) *Attorney, Agent, or Firm* — Steven Rinehart

(57) ABSTRACT

A bee nesting block, comprising: a first arrangement having a first slab, a second slab, a third slab and a fourth slab, wherein a stacked first arrangement forms a first staggered ledge and a second staggered ledge to provide a landing surface and greater planer space as a visual cue for improved nest recognition for one or more mason bees; and a second arrangement having a fifth slab, a sixth slab, a seventh slab and an eighth slab, wherein a stacked second arrangement forms a third staggered ledge and a fourth staggered ledge to provide a landing surface for the one or more mason bees; wherein the first arrangement is stacked onto the second arrangement to form the bee nesting block having a hexagonal shape; wherein the first arrangement stacked on to the second arrangement are fastened to one another using a plurality of bands or sleeves.

11 Claims, 11 Drawing Sheets

(56) References Cited

U.S. PATENT DOCUMENTS

| | | | |
|---|---|---|---|
| 7,086,924 B2 * | 8/2006 | Mills | A01K 67/033 119/6.5 |
| D666,780 S * | 9/2012 | Novi | D30/108 |
| 8,465,340 B1 * | 6/2013 | Allan | A01K 67/033 449/26 |
| 8,517,793 B2 * | 8/2013 | Weeden | A01K 47/06 449/13 |
| 9,801,358 B1 * | 10/2017 | Allan | A01K 47/06 |
| 11,160,258 B1 * | 11/2021 | Chiles | A01K 47/06 |
| 2007/0218804 A1 * | 9/2007 | Allan | A01K 47/00 449/4 |
| 2019/0069525 A1 * | 3/2019 | Bell | A01K 47/02 |

FOREIGN PATENT DOCUMENTS

| | | | |
|---|---|---|---|
| RU | 186446 U1 * | 1/2019 | |
| RU | 190882 U1 * | 7/2019 | |
| WO | WO-2020070566 A1 * | 4/2020 | A01K 47/00 |

* cited by examiner

HEXAGONAL NESTING BLOCK FOR SOLITARY TUNNEL NESTING BEES AND OTHER HYMENOPTERANS

FIELD OF THE INVENTION

This invention relates to pollination and nesting blocks for hymenopterans; and more particularly relates to nesting blocks for solitary tunnel nesting bees.

BACKGROUND

Description of the Related Art

In the United States, honey bees have been typically looked upon as the only pollinator of seed production and farm crops. Domesticated hives of honey bees are typically rented and placed as needed, to facilitate the necessary pollination. Over $235 billion worth of crops worldwide rely upon pollination by insects, and of these, honey bees have carried the largest portion of the pollination workload. Many fresh fruit and vegetable, nut and seed crops rely upon insect pollination, including: almond, apple, blueberry, strawberry, cherry, kiwi, apricot, watermelon, cucurbits, bramble fruits, and many other fruits and nuts. Many seed crops also rely on insect pollination, including alfalfa, sunflower, turnip, buckwheat, artichoke, onion, and others.

On most crops, honey bees can provide an adequate job of pollinating. However, for some crops the honey bees provide only marginal pollination. This may be due to any of a variety of reasons including blooming patterns and blossom/flower anatomy. For instance, some crops bloom at lower temperatures and hence prior to the activity temperature of honey bees. There has been a precipitous decline in the number of honey bees available for pollination, resulting in a shortage of managed hives, and a subsequent increase in cost for this traditional pollination service.

The causes for the honey bee colony losses are attributed to tracheal mites and Varroa mites, starvation, weather-related loss, queen failure, direct and indirect effects of toxic chemicals, and other mitigating and compounding factors. This has resulted in farmers scrambling to find adequate pollinators for their crops.

Unfortunately, the small to medium-sized farm and farmers have felt the pinch the most severely. In this period of shortage, the suppliers of rented honey bee colonies have naturally catered to their larger accounts, and the smaller farms have been seriously in need of a pollinator for their crops. Moreover, it is often the small farmer who is found working the smaller pieces of ground located close to or amongst homes and commercial areas, where complaints from residents over permanent or rented honey bee colonies have prompted concerns and conflicts.

Efforts are underway to supplement and in some cases replace the belabored honey bee. This is done by rearing and introducing pollinating solitary bees in orchards, fields, backyards and other growing environments. This typically involves the introduction of male and female solitary bees, and the placement of manmade tubular nesting habitats of specific dimensions which lure femals. Solitary bees are particular in their nesting preferences, and if manmade nesting habitats are found acceptable by fertile hymenopteran females, they will provision the length of the tubular cavity with partitioned food stores— usually pollen and nectar. The relentless back-and-forth between the floral resource and the nest is what makes nesting females powerful pollinators. The food stores gathered by the female are divided by natural partitions, resulting in a series of individual "chambers" wherein a single egg is laid atop or amidst each chambered food store. Each hatching larvae consumes their own chambered food store, and complete their metamorphosis process. This results in several chambered cocoons throughout the length of the tubular cavity. Some of these habitats comprise blocks of wood into which small holes have been drilled and into which paper straws may be optionally inserted. Other habitats are bundles of paper straws, or hollow reeds. For those propagating these insects, these two methods make inspection, cleaning, and offspring access, difficult. Furthermore, reeds and straws aren't always reusable, and weak walls permit parasite intrusion. Wood blocks can be heavy, and drilled holes limit human access for annual inspection and cocoon harvest. If the nests cannot be properly accessed, disinfected, and purged, the surviving hymenopteran or its offspring will eventually succumb to disease, pathogens, parasites, or other undesirable outcomes.

Superior nesting solutions are those which are designed to be more accessible, and potentially reusable. However, despite some accessible nesting solutions being created, their designs are basic and continue to ignore the predilections of nesting females, growing environments, and economies of scale. The need persists for improved material, design, and techniques for the rearing and managing of certain solitary bees in certain crops before solitary bees can be used on an increasing scale as successful or sustainable pollinators.

Thus, the need continues for improved bee nesting blocks which can remedy the drawbacks faced by these conventional nesting solutions.

It is therefore desirable, and an object of the present invention, to provide a superior nesting block solutions for solitary tunnel nesting bees.

SUMMARY

From the foregoing discussion, it should be apparent that a need exists for improved solitary tunnel nesting block. The present invention has been developed in response to the present state of the art, and in particular, in response to the problems and needs in the art that have not yet been fully solved by currently available nesting solutions. Accordingly, the present invention has been developed to provide an hexagonal solitary bee nesting block comprising: a plurality of slabs positioned one upon another to form a hexagonal shape from a forward perspective, each slab defining a plurality of hemi-cylindrical cavities, wherein each hemi-cylindrical cavity mates with a corresponding hemi-cylindrical cavity on an adjoining block to form a tubular nesting cavity; wherein each slab defines one or more of a protuberance running with a z-axis and track recess adapted to mate with a protuberance on an adjoining slab; wherein the slabs collectively form a plurality of rows of tubular nesting cavities, wherein the tubular nesting cavities are staggered from one row to another; wherein a length of each slab on a z-axis varies from a length of adjoining slabs; wherein the slabs are held together by tensile force from one or more circumscribing bands.

The hexagonal solitary bee nesting block may further comprise a textured forward surface on a face of one or more slabs. In various embodiments, a diameter of each tubular nesting cavity varies from 3 mm to 10 mm. In still further embodiments, the block comprises a plurality of tubular nesting cavities having one of: a plurality of nonuniform diameters and plurality of nonuniform diameters.

The block may be at least 4 inches in height and width measured from one of: a vertex to a diametrically-opposed vertex and a face to a diametrically-opposed face.

A face of the block may be inclined such that a forward surface of every slab is recessed behind a forward surface of an adjoining inferiorly-placed slab.

The hexagonal solitary bee nesting block may further comprise a detachable triangular cocoon storage box joined to the slabs, the triangular cocoon storage box adapted to house a plurality of cocooned hymenoptera extracted from the tubular nesting cavities.

The triangular cocoon storage box may define an open bore hole and wherein the triangular cocoon storage box is adapted to receive a plurality of cocooned hymenoptera inserted into the triangular cocoon storage box.

In some embodiments, the triangular cocoon storage box further comprises a top flap hingedly connected which opens to expose an interior recess of the triangular cocoon storage box. The block may be rotated by 1 to 89 degrees relative to a ground surface to prevent accumulation of precipitation on any surface of the block.

In other embodiments, the block is joined together with a plurality of adjoining blocks to form an assembly of blocks to maximize tubular cavities within an allotted space, eliminate unnecessary cavities with the plurality, and strengthen the joined blocks. The assembly of blocks may joined together using one or more circumscribing bands in still further embodiments.

The hexagonal solitary bee nesting block may further comprise a porous backplate affixed behind the slabs, the porous backplate comprising a non-caustic material.

The hexagonal solitary bee nesting block may further comprise a hexagonal pocket box positioned behind the porous backplate.

In various embodiments, the hexagonal solitary bee nesting block additionally comprises a shaft adapted to penetrate the hexagonal solitary bee nest, the porous backplate, and the pocket box.

A second hexagonal solitary bee nesting block is provided comprising: a plurality of slabs positioned one upon another to form one of a hexagonal shape and octagonal shape from a forward perspective, each slab defining a plurality of hemi-cylindrical cavities, wherein each hemi-cylindrical cavity mates with a corresponding hemi-cylindrical cavity on an adjoining block to form a tubular nesting cavity; wherein each slab defines one or more of a protuberance running with a Z axis and track recess adapted to mate with a protuberance on an adjoining slab; wherein the slabs collectively form a plurality of rows of tubular nesting cavities; wherein the slabs are held together by tensile force from one or more circumscribing bands.

A face of the block may be inclined such that a forward surface of every slab is recessed behind a forward surface of an adjoining inferiorly-placed slab.

The hexagonal solitary bee nesting block may further comprise a cocoon storage box adapted to house a plurality of cocooned hymenoptera extracted from tubular nesting cavities.

In some embodiments, the block is rotated by 1 to 89 degrees to prevent accumulation of precipitation on any surface of the block.

A third solitary bee nesting block is also provided comprising: a plurality of slabs positioned one upon another to form one of a hexagonal shape and octagonal shape from a forward perspective, each slab defining a plurality of hemi-cylindrical cavities, wherein each hemi-cylindrical cavity mates with a corresponding hemi-cylindrical cavity on an adjoining block to form a tubular nesting cavity; wherein each slab defines one or more of a protuberance running with a Z axis and track recess adapted to mate with a protuberance on an adjoining slab; wherein the slabs collectively form a plurality of rows of tubular nesting cavities; wherein the slabs are held together by tensile force from one or more circumscribing bands.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

Figure 1:
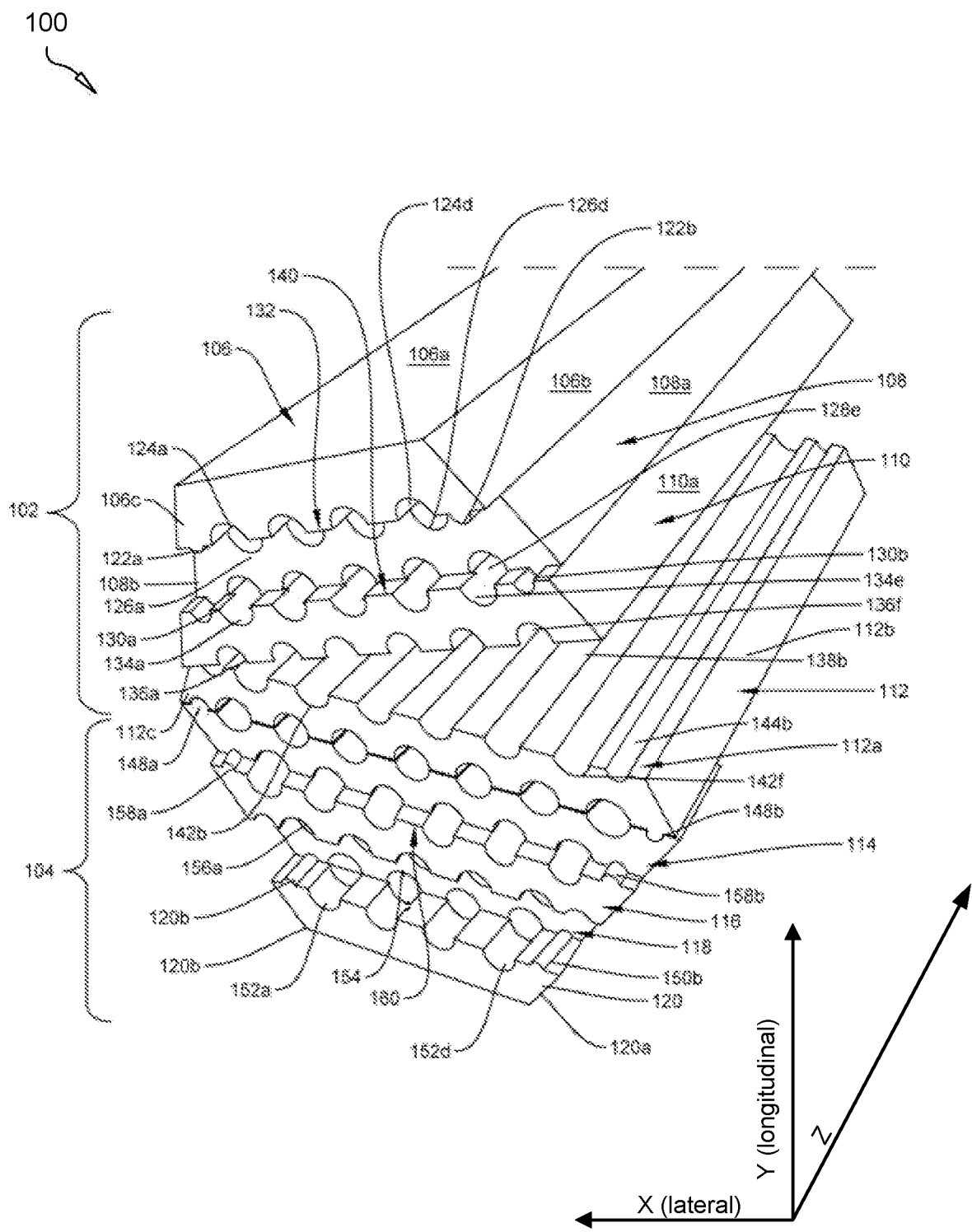
FIG. 1 illustrates an exploded view of a bee nesting block, according to an embodiment of the present invention.

FIG. 1 illustrates an exploded view of a solitary tunnel bee nesting block 100, according to an embodiment of the present invention. The bee nesting block 100 may be used to house one or more solitary tunnel nesting bees (also called mason bees hereinafter as well as hymenopteran). As many at 20 eggs may be laid in each cavity of the nesting block 100 by a single nesting female hymenopteran. The quantity of eggs laid per 6 inch cavity length may be predicted according to the species and their preferred diameter and environment. Each egg may be separated by a partition of mud, leaves, blossoms, leaf pulp, small rocks, resin, plant hairs, or other natural resource(s). A single female solitary bee can make 30,000 or more trips to the bee nesting block 100 in a six week period. The bee nesting block 100 may be adapted for use in orchards and other areas to assist with pollination of one or more crops, according to embodiments of the present invention.

The bee nesting block 100 comprises a first arrangement 102 and a second arrangement 104, according to an embodiment of the present invention. It is an object of the present invention, as shown in FIG. 1, to provide a solitary bee nesting block 100 which is hexagonal in shape from a forward perspective. In some embodiments, the block 100 may be octahedral. The block 100 is divided into a plurality of layers, slabs 302 (further described and shown below in relation to FIG. 3), or fluted laminates, which rest one upon another. The stacked fluted laminates, or slabs 302, is greater than 4 inches in height.

The first arrangement 102 may comprise a first slab 106, a second slab 108, a third slab 110, a fourth slab 112, and so on. The second arrangement 104 may comprise a fifth slab 114, a sixth slab 116, a seventh slab 118, an eighth slab 120, and so on.

In short, the first arrangement 102 comprises a plurality of slabs 302 (such as slabs 102-120), from two to 20 or more per arrangement 102, 104, which are stacked one upon another. Each slab 302 positions superiorly to an underlaying slab, which underlying slab is wider in width than the slab 302 superior to it in the first arrangement 102, such that the slabs 302 taper through the height of the first arrangement 102. Likewise, the slabs of the second arrangement 104 taper inferiorly as they go, with each slab 302 positioned inferiorly to a higher slab being narrower in width.

As taught below, a plurality of tubular cavities 304 (such as cavity 124), or tunnels, are formed by the slabs 306 into which a hymenopteran nests and lays a plurality of eggs. Each tubular cavity 304 is formed by a lower hemi-cylindrical recess 508 (shown and described further below in relation to FIG. 5) defined by a lower edge 504 of a superior slab 302 and by a corresponding upper hemi-cylindrical recess 508 defined by an upper edge 502 of an inferior slab 302, such that tubular cavities are staggered across the face(s) 302 of the block(s) 100. The block 100 may be rotated such that the slabs position longitudinally (along the shown Y axis) or laterally (along the shown X axis) to one another.

The tubular cavities 304 may all be of uniform diameter or may vary from one to another to accommodate different size hymenoptera. In the shown embodiment, the tubular cavities are approximately 8 mm in diameter, but may vary from 3 mm to up to 10 mm in diameter. The diameter of the tubular cavities 304 may be predetermined to induce only certain species of hymenoptera to next within the block 100, and/or block assemblies 300.

As shown in FIG. 1, the slabs 302 are not all of uniform length on the Z axis. The faces of every other slab 302 are recessed inwardly from slabs 302 above and/or below, such that the block 100 has a stepped, tiered, or staggered face 306. This adaptation is provided such that solitary nesting bees have a platform upon which they can land on the face 306 of the block 100, and offers greater planer space as a visual cue for improved recognition of their chosen tunnel(s). This adaptation further facilitates reduction of mass and weight of the block 100 and maximizes or otherwise partitions the dimensional flight space of each hymenoptera landing upon the block 100.

According to embodiments of the present invention, the first slab 106, the second slab 108, the third slab 110 and the fourth slab 112 may be stacked to form the first arrangement 102. According to embodiments of the present invention, the first slab 106, the second slab 108, the third slab 110 and the fourth slab 112 may be made up of a material such as, but not limited to, a paper substrate, wood, plastic, a wood-plastic composite, aluminum, and so forth. Embodiments of the present invention are intended to include or otherwise cover any type of the material for the first slab 106, the second slab 108, the third slab 110 and the fourth slab 112, known to a person skilled in the art.

According to embodiments of the present invention, the fifth slab 114, the sixth slab 116, the seventh slab 118 and the eighth slab 120 may be stacked to form the second arrangement 104. According to embodiments of the present invention, the fifth slab 114, the sixth slab 116, the seventh slab 118 and the eighth slab 120 may be made up of a material such as, but not limited to, a paper substrate, wood, plastic, a wood-plastic composite, aluminum, and so forth. Embodiments of the present invention are intended to include or otherwise cover any type of the material for the fifth slab 114, the sixth slab 116, the seventh slab 118 and the eighth slab 120, known to a person skilled in the art.

According to an embodiment of the present invention, the first slab 106 may comprise a first top face 106*a*, a first right wall 106*b*, a first left wall 106*c* and a first bottom face (not shown). The first right wall 106*b* may be a slanted wall having an interior angle of 120 degrees with respect to the first top face 106*a*, according to an embodiment of the present invention. As used herein "the interior angle" refers to an angle made between the first right wall 106*b* and the first top face 106*a* as seen from a central point. Similarly, the first left wall 106*c* may be a slanted having an interior angle of 120 degrees with respect to the first top face 106*a*. As used herein "the interior angle" refers to an angle made between the first left wall 106*c* and the first top face 106*a* as seen from the central point. The first slab 106 may comprise a first left protrusion 122*a* at a first end of the first bottom face and the first right protrusion 122*b* at a second end of the first bottom face, according to embodiments of the present invention. Further, the first slab 106 may comprise a plurality of first cavities 124*a*-124*d* (hereinafter referred to as the first cavities 124), according to embodiments of the present invention. The first cavities 124 may be semicircular cavities that may be used enable the solitary bee or hymenopteran to lay one or more eggs, according to an embodiment of the present invention.

Figure 2A:
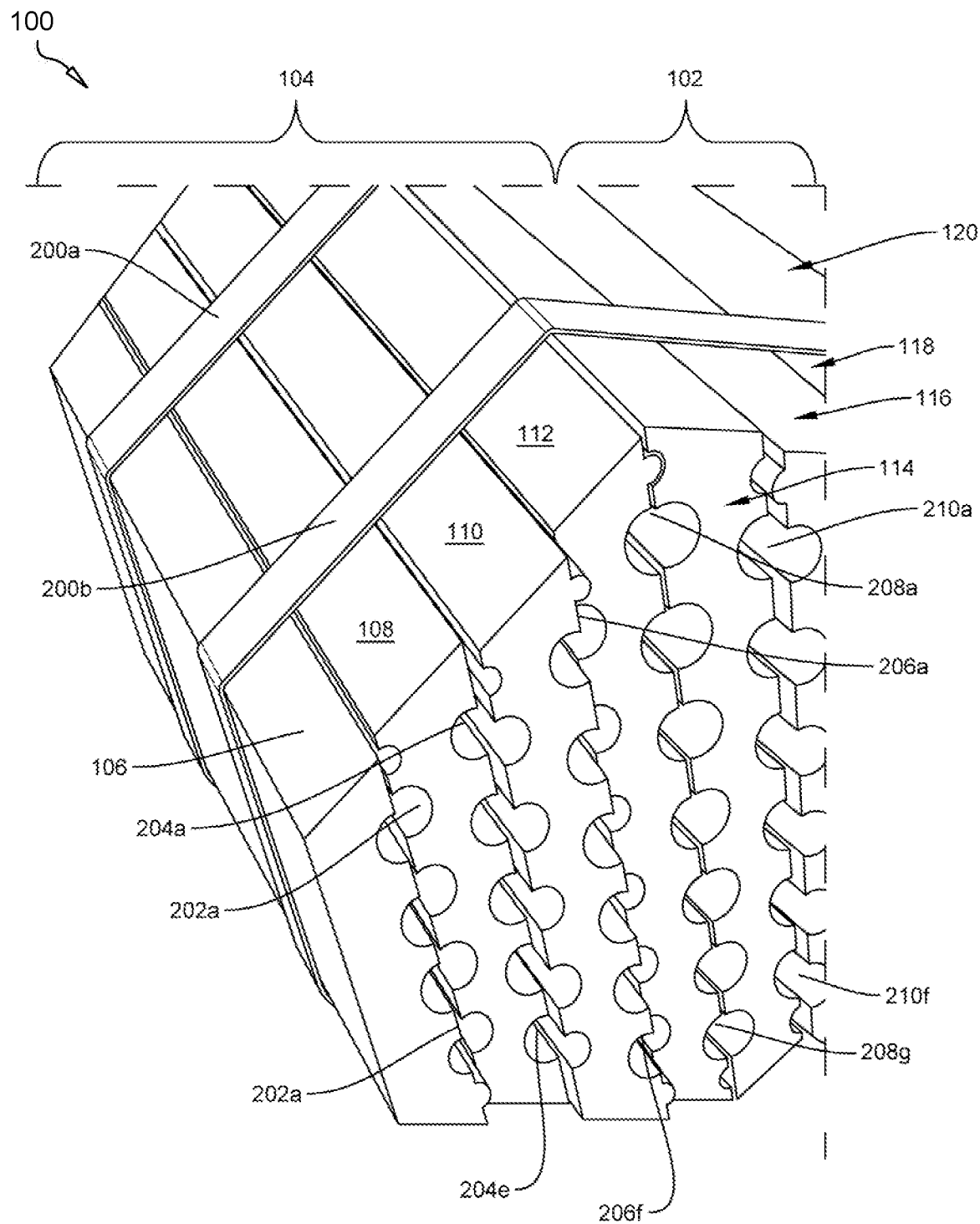
FIG. 2A illustrates a first arrangement fastened with a second arrangement to form the bee nesting block, according to an embodiment of the present invention.

According to an embodiment of the present invention, the second slab 108 may comprise a second top face (not shown), a second right wall 108*a*, a second left wall 108*b* and a second bottom face (not shown). The second top face may comprise a plurality of second top cavities 126*a*-126*d* (hereinafter referred to as the second top cavities 126), according to embodiments of the present invention. The second top cavities 126 may be aligned with the first cavities 124 of the first slab 106 to form a plurality of first tubular cavities 202*a*-202*d* (as shown in FIG. 2A) for the solitary bee or hymenopteran to lay one or more eggs. Further, the second top face may comprise a second right aperture (not shown) at a first end of the second top face and the second left apertures (not shown) at a second end of the second top face, according to embodiments of the present invention. The second right aperture may be provided to be engaged with the first right protrusion 112*b* and the second left aperture may be provided to be engaged with the first left protrusion 112*a* when the first slab 106 is stacked onto the second slab 108, in an embodiment of the present invention.

Further, the second right wall 108*a* may be a slanted wall that may align with the first right wall 106*b* of the first slab 106 when the first slab 106 is stacked onto the second slab 108. The second left wall 108*b* may be a slanted wall that may align with the first left wall 106*c* of the first slab 106 when the first slab 106 is stacked onto the second slab 108 according to an embodiment of the present invention. According to an embodiment of the present invention, the second bottom face of the second slab 108 may comprise a plurality of second bottom cavities 128*a*-128*e* (hereinafter referred to as the second bottom cavities 128). According to embodiments of the present invention, the second bottom face of the second slab 108 may comprise a second left protrusion 130*a* at a first end (not shown) of the second bottom face and the second right protrusion 130*b* at a second end (not shown) of the second bottom face, according to embodiments of the present invention.

According to embodiments of the present invention, a length of the first slab 106 may be greater than a length of the second slab 108 such that the first slab 106 extends to a front portion over the second slab 108 forming a first ledge 132. The first ledge 132 may be a staggered ledge comprising the first cavities 124 to provide a safe landing area, more area as a visual cue, and more partitioned flight space for the mason bees, according to embodiments of the present invention.

According to an embodiment of the present invention, the third slab 110 may comprise a third top face (not shown), a third right wall 110*a*, a third left wall 110*b* and a third bottom face (not shown). The third top face may comprise a plurality of third top cavities 134*a*-134*e* (hereinafter referred to as the third top cavities 134), according to embodiments of the present invention. The third top cavities 134 may be aligned with the second bottom cavities 128 of the second slab 108 to form a plurality of second tubular cavities 204*a*-204*e* (as shown in the FIG. 2A) for the mason bee to lay one or more eggs. Further, the third top face may comprise a third right aperture (not shown) at a first end of the third top face and the third left apertures (not shown) at a second end of the third top face, according to embodiments of the present invention. The third right aperture may be provided to be engaged with the second right protrusion 130*b* and the third left aperture may be provided to be engaged with the second left protrusion 130*a* when the second slab 108 is stacked onto the third slab 110, in an embodiment of the present invention.

Further, the third right wall 110*a* may be a slanted wall that may align with the second right wall 108*a* of the second slab 108 when the second slab 108 is stacked onto the third slab 110. The third left wall 110*b* may be a slanted wall that may align with the second left wall 108*b* of the second slab 108 when the second slab 108 is stacked onto the third slab 110, according to an embodiment of the present invention. According to an embodiment of the present invention, the third bottom face of the third slab 110 may comprise a plurality of third bottom cavities 136*a*-136*f* (hereinafter referred to as the third bottom cavities 136). According to embodiments of the present invention, the third bottom face of the third slab 110 may comprise a third left protrusion 138*a* at a first end (not shown) of the third bottom face and a third right protrusion 138*b* at a second end (not shown) of the third bottom face, according to embodiments of the present invention.

According to embodiments of the present invention, a length of the third slab 110 may be greater than a length of the second slab 108 such that the third slab 110 extends to a front portion over the second slab 108 forming a second ledge 140. The second ledge 140 may be a staggered ledge comprising the third top cavities 134 to provide a safe landing area, more area as a visual cue, and a more partitioned flight space for the mason bees, according to embodiments of the present invention.

According to an embodiment of the present invention, the fourth slab 112 may comprise a fourth top face 112*a*, a fourth right wall 112*b*, a fourth left wall 112*c* and a fourth bottom face (not shown). The fourth top face 112*a* may comprise a plurality of fourth top cavities 142*a*-142*f* (hereinafter referred to as the fourth top cavities 142), according to embodiments of the present invention. The fourth top cavities 142 may be aligned with the third bottom cavities 136 of the third slab 110 to form a plurality of third tubular cavities 206a-206f (as shown in the FIG. 2A) for the mason bee to lay one or more eggs. Further, the fourth top face 112a may comprise a fourth right aperture 144b at a first end of the fourth top face 112a and a fourth left apertures (not shown) at a second end of the fourth top face 112a, according to embodiments of the present invention. The fourth right aperture 114b may be provided to be engaged with the third right protrusion 138b and the fourth left aperture (not shown) may be provided to be engaged with the third left protrusion 138a when the third slab 110 is stacked onto the fourth slab 112, in an embodiment of the present invention.

Further, the fourth right wall 112b may be a slanted wall that may align with the third right wall 110a of the third slab 110 when the third slab 110 is stacked onto the fourth slab 112. The fourth left wall 112c may be a slanted wall that may align with the third left wall 110b of the third slab 110 when the third slab 110 is stacked onto the fourth slab 112, according to an embodiment of the present invention. According to an embodiment of the present invention, the fourth bottom face of the fourth slab 112 may comprise a plurality of fourth bottom cavities 146a-146g (hereinafter referred to as the fourth bottom cavities 146). According to embodiments of the present invention, the fourth bottom face of the fourth slab 112 may comprise a fourth left protrusion 148a at a first end (not shown) of the fourth bottom face and a fourth right protrusion 148b at a second end (not shown) of the fourth bottom face, according to embodiments of the present invention.

According to embodiments of the present invention, a length of the fourth slab 112 may be smaller than a length of the third slab 110 such that the third slab 110 extends to a front portion over the fourth slab 112 forming the second ledge 140.

According to embodiments of the present invention, the fifth slab 114 may be substantially similar in structure as compared to the fourth slab 112 such that the fourth slab 112 may be stacked onto the fifth slab 114 to attach the first arrangement 102 with the second arrangement 104.

According to an embodiment of the present invention, the second arrangement 104 may comprise the eighth slab 120 that may comprise an eighth top face (not shown), an eighth right wall 120a, an eighth left wall 120b and an eighth bottom face (not shown). The eighth top face may have a substantially flat surface that may enable the user to place the bee nesting block 100 onto a flat surface, according to an embodiment of the present invention. Further, the eighth right wall 120a may be a slanted wall having an interior angle of 120 degrees with respect to the eighth top face, according to an embodiment of the present invention. Similarly, the eighth left wall 120b may be a slanted having an interior angle of 120 degrees with respect to the eighth top face. Further, the eighth slab 120 may comprise an eighth left protrusion 150a at a first end of the eighth bottom face and the eighth right protrusion 150b at a second end of the eighth bottom face, according to embodiments of the present invention. Further, the eighth slab 120 may comprise a plurality of eighth cavities 152a-152d (hereinafter referred to as the eighth cavities 152), according to embodiments of the present invention. The eighth cavities 152 may be semicircular cavities that may be used enable the mason bee to lay one or more eggs, according to an embodiment of the present invention.

According to an embodiment of the present invention, the seventh slab 118 may comprise a seventh top face (not shown), a seventh right wall 118a, a seventh left wall 118b and a seventh bottom face (not shown). The seventh top face may comprise a plurality of seventh top cavities that may be aligned with the eighth cavities 152 of the eighth slab 120 to form a plurality of seventh tubular cavities (not shown) for the mason bee to lay one or more eggs. Further, the seventh top face may comprise a seventh right aperture (not shown) at a first end of the seventh top face and the seventh left apertures (not shown) at a second end of the seventh top face, according to embodiments of the present invention. The seventh right aperture may be provided to be engaged with the eighth right protrusion 150b and the seventh left aperture may be provided to be engaged with the eighth left protrusion 150a when the eighth slab 120 is stacked onto the seventh slab 118, in an embodiment of the present invention.

According to an embodiment of the present invention, the seventh bottom face of the seventh slab 118 may comprise a plurality of seventh bottom cavities (not shown). According to embodiments of the present invention, the seventh bottom face of the seventh slab 118 may comprise a seventh left protrusion (not shown) at a first end (not shown) of the seventh bottom face and a seventh right protrusion (not shown) at a second end (not shown) of the seventh bottom face, according to embodiments of the present invention. According to embodiments of the present invention, a length of the eighth slab 120 may be greater than a length of the seventh slab 118 such that the eighth slab 120 extends to a front portion over the seventh slab 110 forming a fourth ledge 154. The fourth ledge 154 may be a staggered ledge to provide a safe landing area, more area as a visual cue, and a more partitioned flight space for the mason bees, according to embodiments of the present invention.

According to an embodiment of the present invention, the sixth slab 116 may comprise a sixth top face (not shown), a sixth right wall 116a, a sixth left wall 116b and a sixth bottom face (not shown). The sixth top face may comprise a plurality of sixth top cavities (not shown), according to embodiments of the present invention. The sixth top cavities may be aligned with the seventh bottom cavities of the seventh slab 118 to form a plurality of sixth tubular cavities 156a-156e (hereinafter referred to as the sixth tubular cavities 156) for the mason bee to lay one or more eggs. Further, the sixth top face may comprise a sixth right aperture (not shown) at a first end of the sixth top face and a sixth left apertures (not shown) at a second end of the sixth top face, according to embodiments of the present invention. The sixth right aperture may be provided to be engaged with the fifth right protrusion and the sixth left aperture may be provided to be engaged with the fifth left protrusion when the sixth slab 116 is stacked onto the fifth slab 114, in an embodiment of the present invention.

According to an embodiment of the present invention, the sixth bottom face of the sixth slab 116 may comprise a plurality of sixth bottom cavities. According to embodiments of the present invention, the sixth bottom face of the sixth slab 116 may comprise a sixth left protrusion 158a at a first end (not shown) of the sixth bottom face and a sixth right protrusion 158b at a second end (not shown) of the sixth bottom face, according to embodiments of the present invention.

According to an embodiment of the present invention, the fifth slab 114 have a plurality of fifth bottom cavities that may be aligned with the sixth top cavities to form a plurality of fifth tubular cavities 210a-210f (as shown in the FIG. 2A) for the mason bee to lay one or more eggs. According to embodiments of the present invention, a length of the fifth slab 114 may be smaller than a length of the sixth slab 116 such that the sixth slab 116 extends to a front portion over the fifth slab 114 forming the third ledge 160. The third ledge 160 may be a staggered ledge to provide a safe landing area, more area as a visual cue, and a more partitioned flight space for the hymenopterans, according to embodiments of the present invention.

FIG. 2A illustrates the first arrangement 102 fastened with the second arrangement 104 to form the bee nesting block 100, according to an embodiment of the present invention. According to embodiments of the present invention, the first slab 106, the second slab 108, the third slab 110 and the fourth slab 112 may be stacked to form the first arrangement 102 and the fifth slab 114, the sixth slab 116, the seventh slab 118 and the eighth slab 120 may be stacked to form the second arrangement 104. Further, the first arrangement 102 may be stacked and fastened with the second arrangement 104 using a plurality of bands 200a-200n thus forming a hexagonal shaped bee nesting block 100, according to an embodiment of the present invention. The bands 200 will be explained in detail in conjunction with FIG. 2B. According to embodiments of the present invention, the first slab 106 may be stacked onto the second slab 108 to form the first tubular cavities 202a-202d. Further, the second slab 108 may be stacked onto the third slab 110 to form the second tubular cavities 204a-204e. Further, the third slab 110 may be stacked onto the fourth slab 112 to form the third tubular cavities 206a-206f. Further, the fourth slab 112 may be stacked onto the fifth slab 114 to form a plurality of fourth tubular cavities 208a-208g. Further, the fifth slab 114 may be stacked onto the sixth slab 116 to form a plurality of fifth tubular cavities 210a-210f, according to an embodiment of the present invention.

Figure 2B:
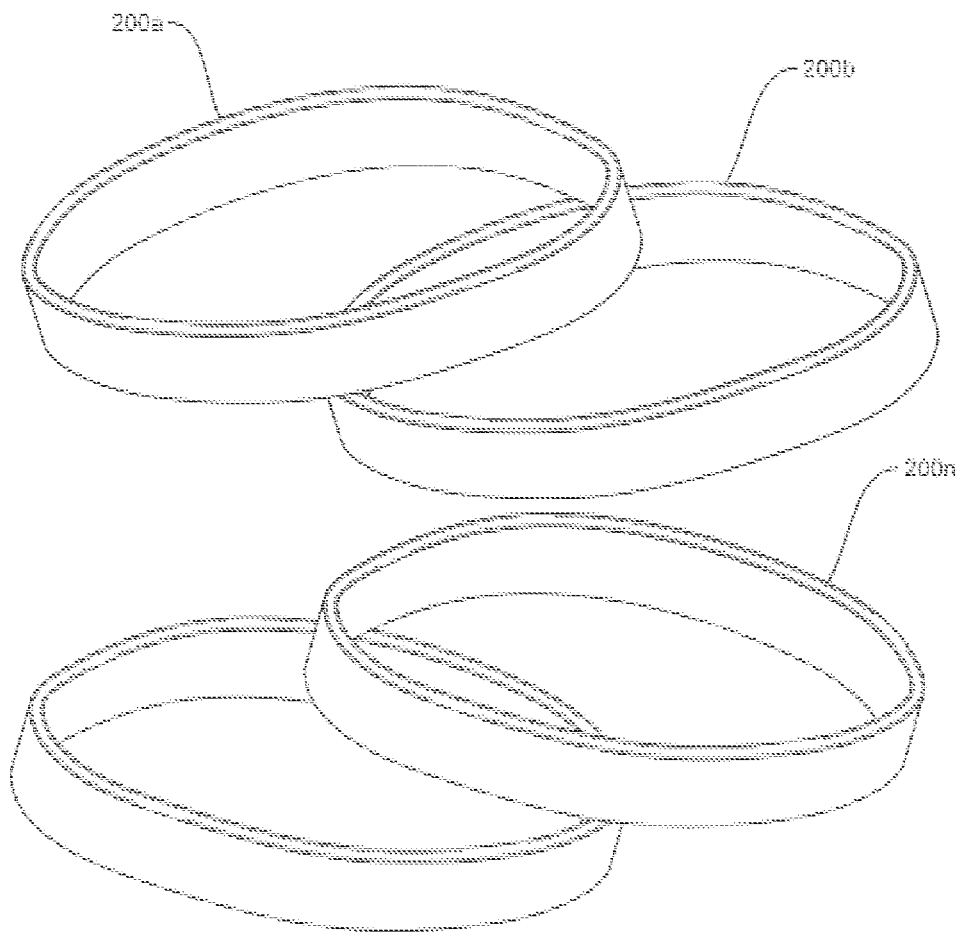
FIG. 2B illustrates a plurality of bands used for fastening the bee nesting block, according to an embodiment of the present invention.

FIG. 2B illustrates the plurality of bands 200a-200n used for fastening the bee nesting block 100, according to an embodiment of the present invention. The bands 200 may be an elastic band made up of a material such as, but not limited to, a natural rubber, a synthetic rubber, silicone, elastic strands, an Ethylene Propylene Diene Monomer (EPDM), and so forth. Embodiments of the present invention are intended to include or otherwise cover any type of the material for the bands 200 known to a person skilled in the art. The slabs 302 of the block 100 are held together with bands instead of brackets or sidewalls.

The bands 200 are adapted to apply equal tensile force along the non-facial surfaces of the block 100, providing simpler, more cost-effective, manner of joining the slabs 302 together.

In various embodiments, the band 200 comprises a polymeric sleeve, or wrap, pressed around the block 100, which may be heat pressed around the block 100. The polymeric sleeve may alternatively be heat shrunk around the block. The band 200 is typically uninterrupted. In other embodiments, the band 200 comprises a stretchable resin or polymeric band.

In various other embodiments, alternative or additional means are used to detachably affix the slabs 302 together, including additional organic or synthetic straps, tongue and grooves, magnet, sleeves, or a backwall detachably affixed to a rearward end of the slabs 302.

Figure 3:
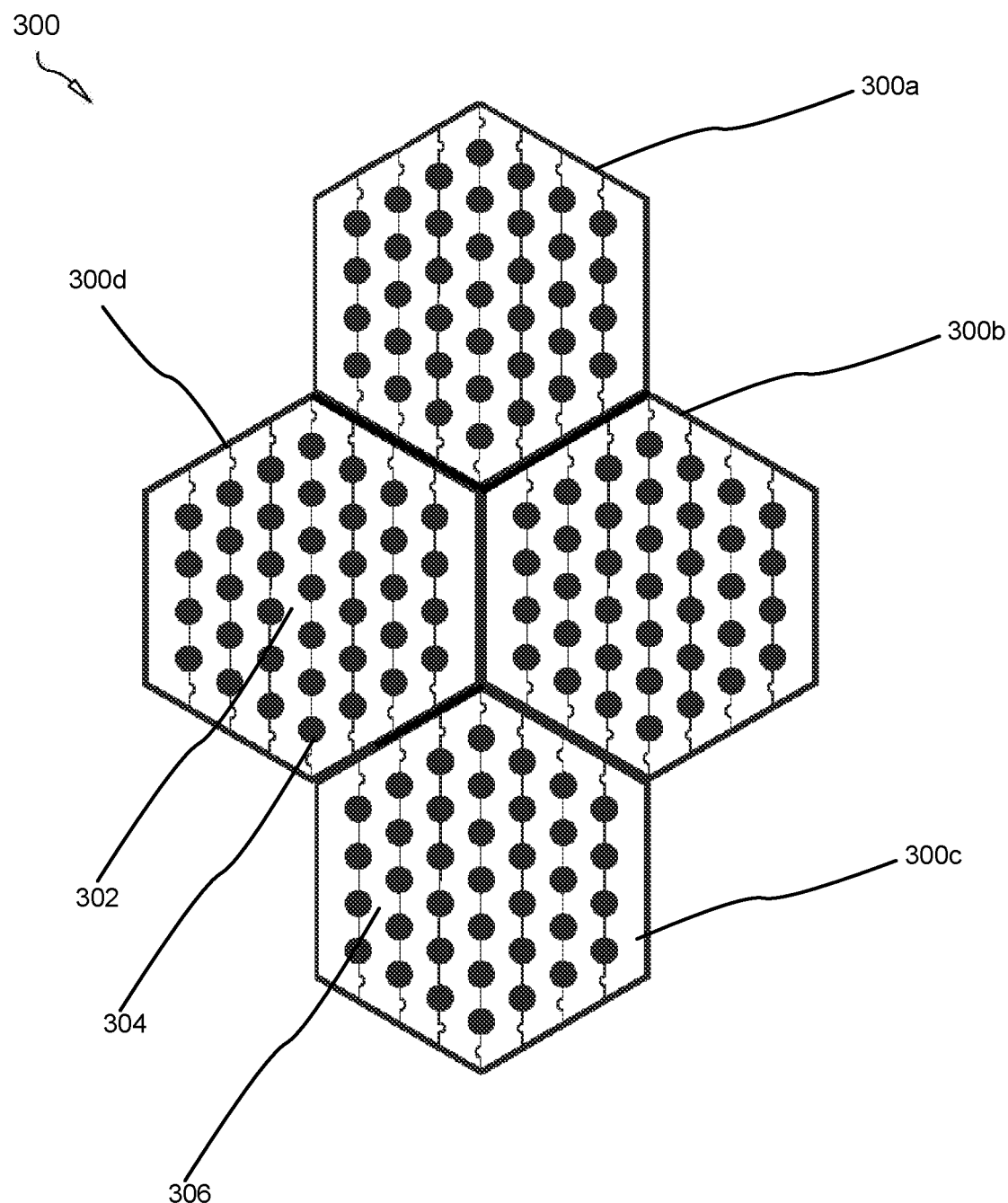
FIG. 3 illustrates an exemplary setup of a plurality of bee nesting blocks, according to an embodiment of the present invention.

FIG. 3 illustrates an exemplary setup 300 of a plurality of bee nesting blocks 302a-302d, according to an embodiment of the present invention. The setup 300 may be arranged by stacking the plurality of bee nesting blocks 302a-302d corresponding to one another to form a honeycomb structure that may provide a larger area for the solitary bees (or hymenopterans), according to an embodiment of the present invention. The plurality of bee nesting blocks 302a-302d may be similar in structure as the bee nesting block 100 as explained in the FIG. 1.

The staggered configuration of tubular nesting cavities, opposed to a non-staggered configuration, allows hymenopterans to more easily recognize and differentiate their nest. In various other embodiments, the tubular nesting cavities are irregularly-spaced across the surface of the nest to assist an hymenoptera in identifying its cavity from the otherwise uniform pattern appearing on the face. The hexagonal shape also allows the block 100 to be rotated axially in the field such that no side 422 of the block 100, 400 is parallel with the ground, permitting runoff of rainfall and precipitation on all sides 422 of the block/habitat 100. Water intrusion may cause mold and/or pathogens to compromise the tubular nesting cavities.

In various embodiments, the face 306 of the block 100 may be inclined such that the face of every slab 302 is recessed on the Z axis behind the face of an adjoining inferiorly-placed slab 302. In these embodiments, not only does precipitation run from a surface of the block, but runoff of water stagnated between slabs 302 is also facilitated.

The setup 300 may also be called as "assembly" or "tessellation."

Figure 4A:
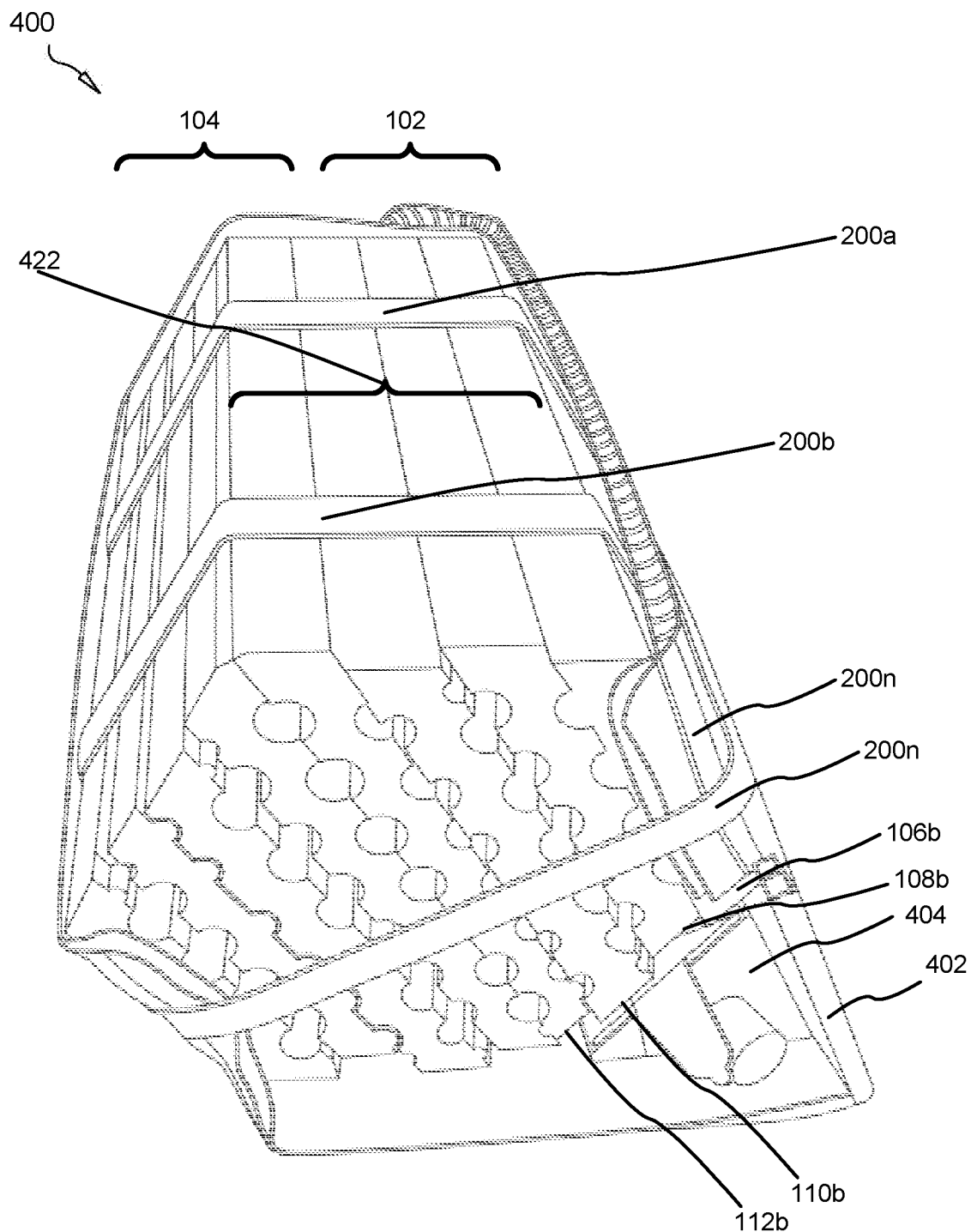
FIG. 4A illustrates a final arrangement of the bee nesting block fastened inside a covering, according to an embodiment of the present invention.

FIG. 4A illustrates a final arrangement 400 of the bee nesting block 100 fastened inside a covering 402, according to an embodiment of the present invention. The first arrangement 102 and the second arrangement 104 may be fastened together using the plurality of bands 200a-200n to form the bee nesting block 100, according to an embodiment of the present invention. Further, the bee nesting block 100 may be enclosed within the covering 402 using the plurality of bands 200a-200n, according to an embodiment of the present invention. The covering 402 may be a flexible cardboard type cover that may be wrapped around the bee nesting block 100 to provide a secure fastening of the bee nesting block 100. Further, the covering 402 may be wrapped around the bee nesting block 100 using a strap or the plurality of bands 200a-200n, according to an embodiment of the present invention. The covering 402 may be made up of a material such as, but not limited to, a natural plastic, a synthetic plastic, a waxed cardboard, a corrugated plastic, tin, steel, aluminum, copper, and so forth. Embodiments of the present invention are intended to include or otherwise cover any type of the material for the covering 402 known to a person skilled in the art. Further, the arrangement 402 comprises a pocket box 404 that may be arranged parallel to the first right wall 106b, the second right wall 108b, the third right wall 110b and the fourth right wall 112b, in an embodiment of the present invention. Further, the pocket box 404 will be explained in detail in FIG. 4B.

Figure 4B:
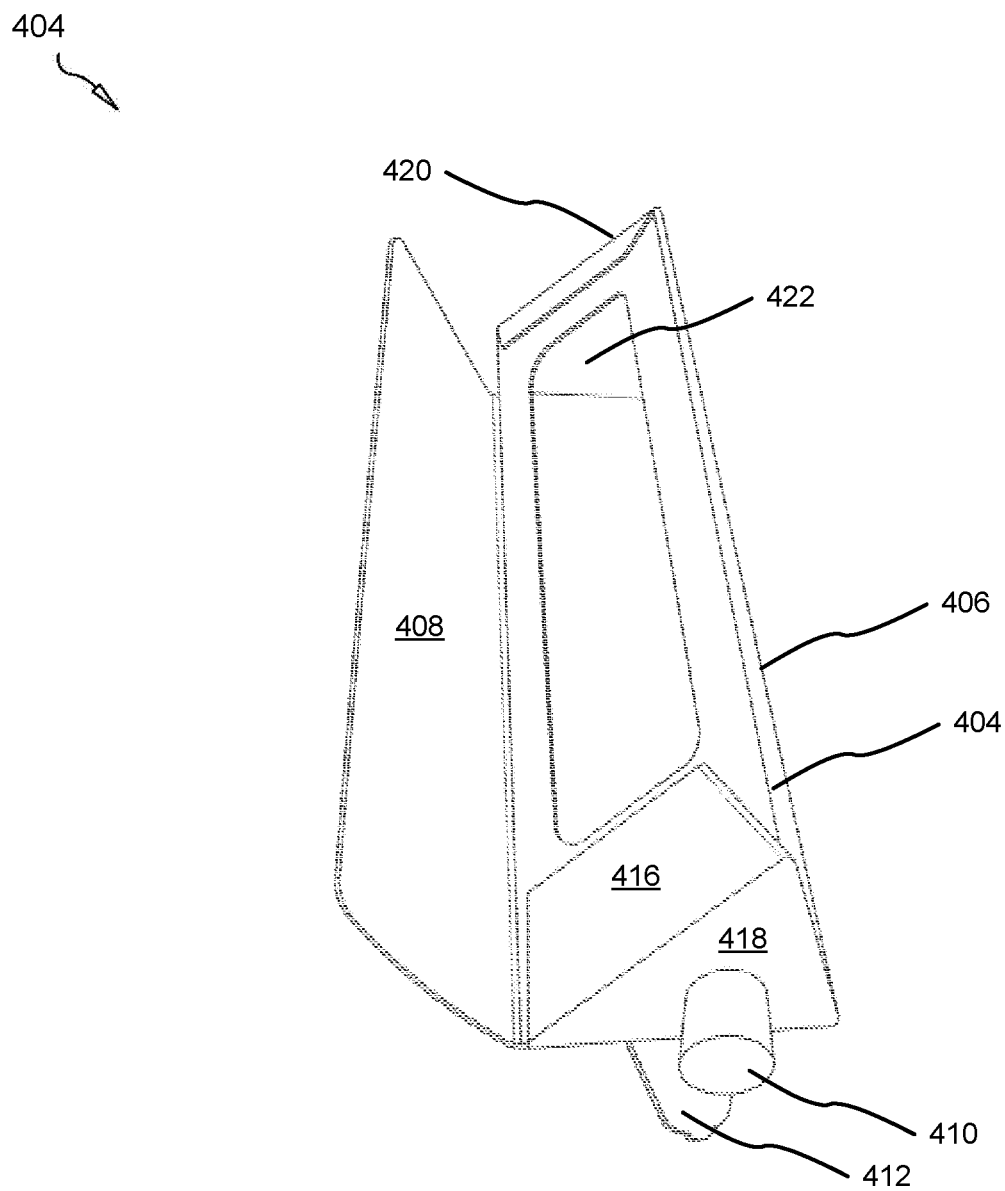
FIG. 4B illustrates a pocket box of the final arrangement, according to an embodiment of the present invention.

FIG. 4B illustrates a triangular cocoon storage box, emergence box, or pocket box 404, of the final arrangement 400, according to an embodiment of the present invention. The pocket box 404 may comprise a body 406, a cover flap 408, a port 410, and a pick flap 412, according to an embodiment of the present invention. Further, the body 406, the cover flap 408, the port 410, and the pick flap 412 may be fabricated as a single piece to form the pocket box 404, in an embodiment of the present invention. In another embodiment of the present invention, the body 406, the cover flap 408, the port 410, and the pick flap 412 may be fabricated as a plurality of discrete pieces and further assembled to form the pocket box 404. The body 406, the cover flap 408, the port 410, and the pick flap 412 may be made up of a material such as, but not limited to, a wooden sheet, a cardboard, a paper, a plastic, and so forth. Embodiments of the present invention are intended to include or otherwise cover any type of the material for the body 406, the cover flap 408, the port 410, and the pick flap 412, known to a person skilled in the art.

The triangular cocoon storage box 404, pocket box, or emergence box, is adapted to facilitate storage of cocooned hymenopterans for shipment, loading, and/or replacement in pollination operations.

According to an embodiment of the present invention, the body 406 may be a triangular structure having a first side 414, a second side 416, a front side 418 and a back side 420. The first side 414 may be a flat solid face of the pocket box 404, according to an embodiment of the present invention. Further, the second side 416 may comprise a rectangular cavity 422. The back side 420 may further be a flat solid face and the front side 418 may comprise the port 410. According to an embodiment of the present invention, the port 410 may be removably attached within an aperture (not shown) that is carved, cut or punched into the front side 418. In another embodiment of the present invention, the port 410 may be fixedly attached within the aperture carved into the front side 418. Further, the cover flap 408 may be attached to a bottom end of the second side 416 such that the cover flap 408 may be folded onto the second side 416 to cover the rectangular cavity 422, according to an embodiment of the present invention.

Exact size, measurement, construction, and design specifications may vary upon further development and manufacturing. What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Figure 5:
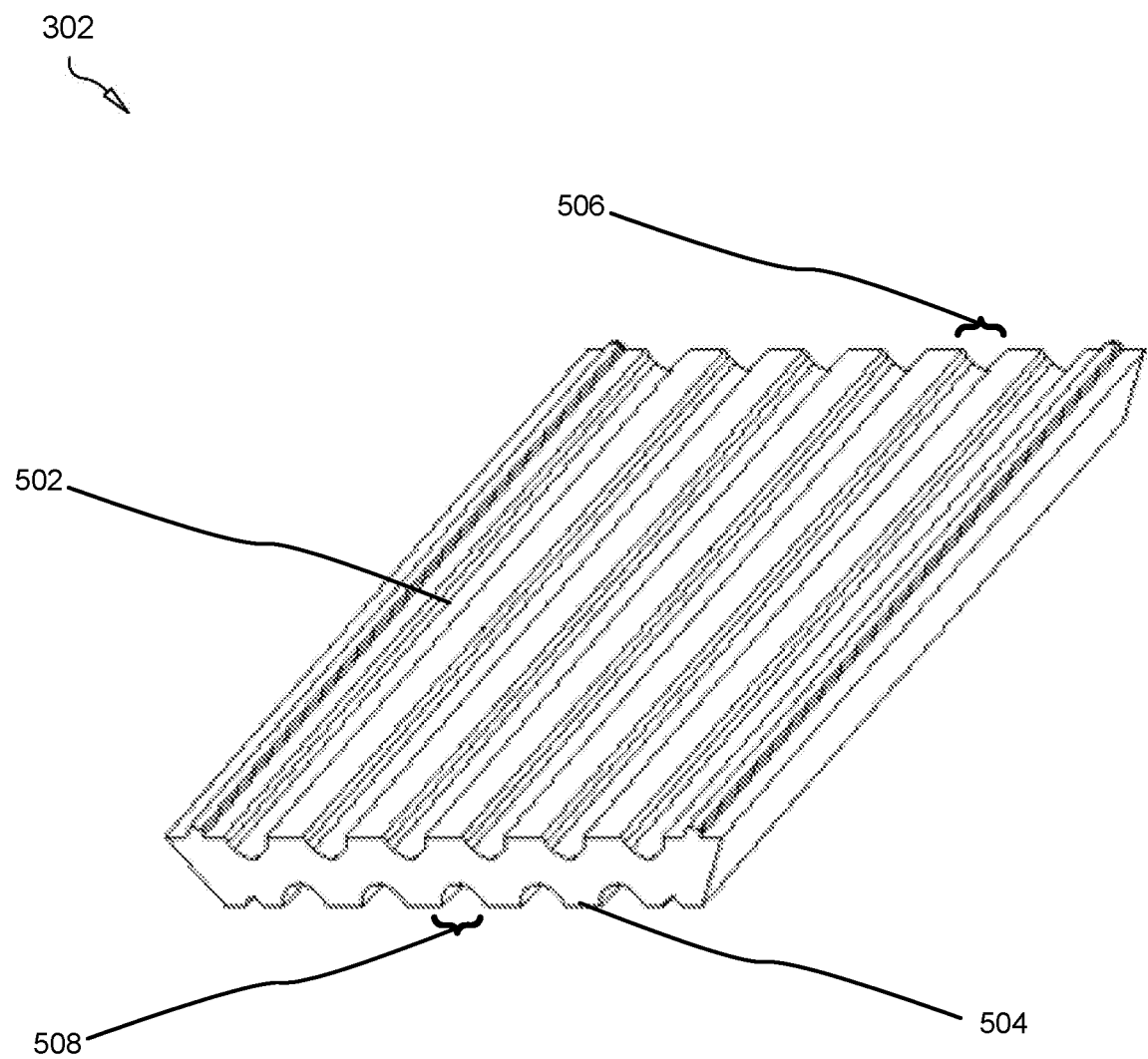
FIG. 5 illustrates a slab of a bee nesting block, according to an embodiment of the present invention.

FIG. 5 illustrates a slab 302 of a bee nesting block, according to an embodiment of the present invention.

The slab 302 may be substantially planar, with recesses carved from the planar surfaces, as shown.

Figure 6:
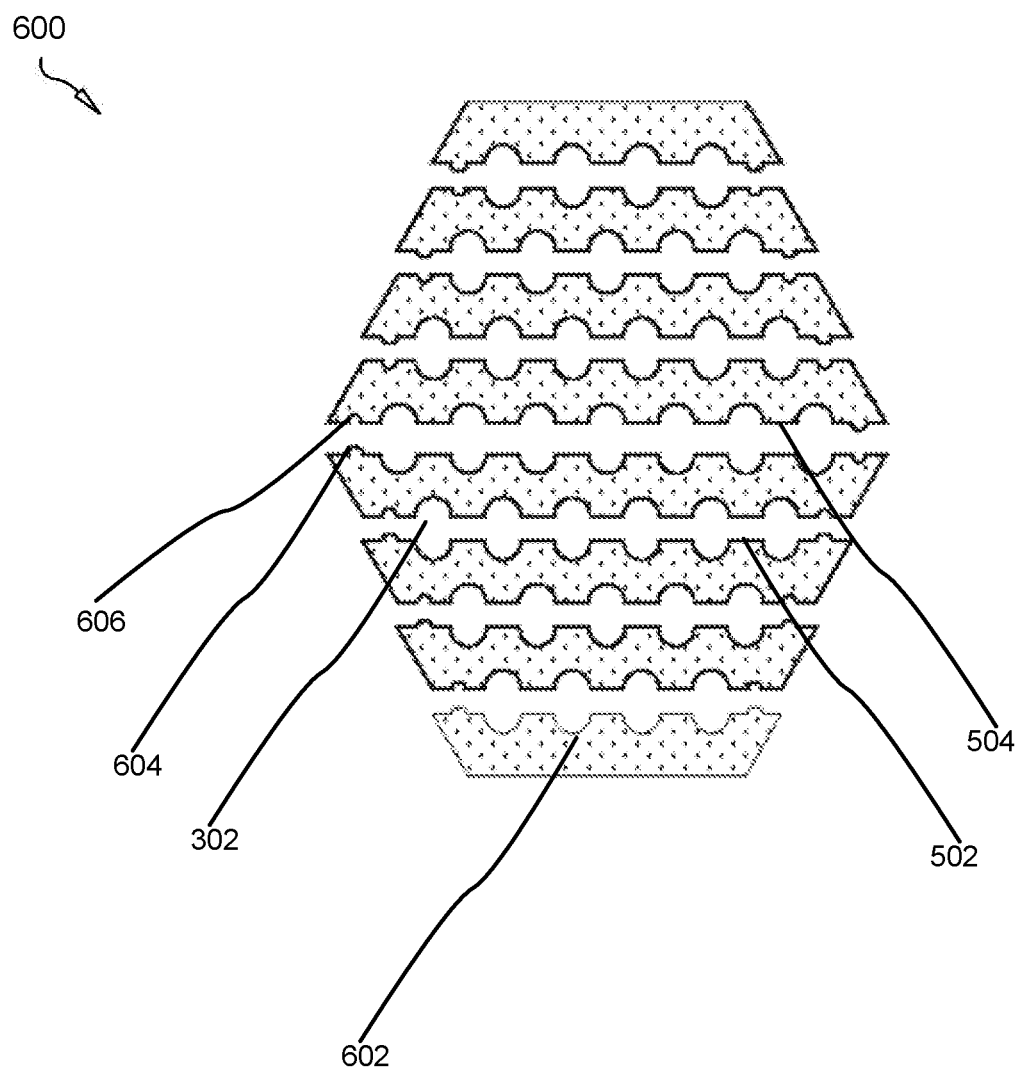
FIG. 6 illustrates a forward perspective view of a bee nesting block, according to an embodiment of the present invention.

FIG. 6 illustrates a forward perspective view of a bee nesting block, according to an embodiment of the present invention.

In various embodiments, the face 306 of the slabs 302 is textured with texturing 602 to provide surfacing upon which a solitary nesting bee may land.

Each slab 302 comprises one or more of a protuberance 604 and track recess 606 (or notches). The protuberance 604 may comprise or consist of a protrusion 158, for instance. The protuberances 604 jut longitudinally from an upper surface 502 of the slab 302 or from a lower surface 504 of the slab 302. The protuberances 604 and track recesses 606 run with the Z axis of the slabs 302.

Each protuberance 604 is adapted to mate with a corresponding track recess 606 on an adjoining slab 302 (or fluted laminate). In this manner each slab 302 stabilizes an adjoining slab 302, improving dimensional integrity of the block 100 when disposed environmentally.

Figure 7:
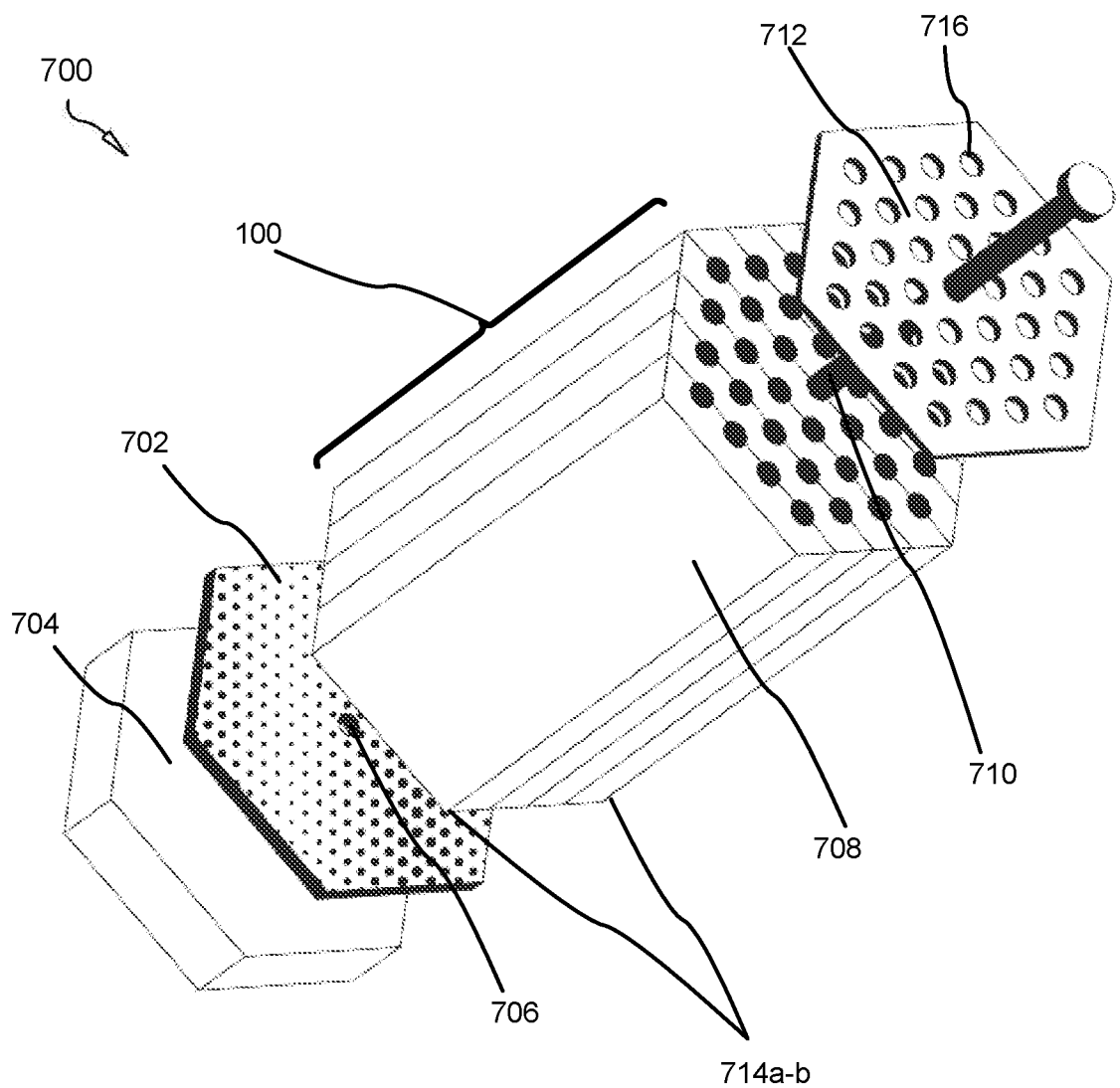
FIG. 7 illustrates an exploded view of a bee nesting block assembly, according to an embodiment of the present invention.

FIG. 7 illustrates an exploded view of a bee nesting block assembly 700, according to an embodiment of the present invention.

A face of the nest 100 is indicated at 708. Vertices are indicated at 714.

The assembly 700 comprises a backplate 702 made of a non-caustic porous material adapted to permit evaporation of water and deter mold within the nest 100. The backplate 702 may limit light intrusion into the nest 100. The backplate 702 may be made from a flexible material such as a foam or fabric, or a rigid, or semi-rigid material. The backplate 702 may be hexagonal and dimensioned to contour the surfaces 708 and vertices 714 of the nest 100. In various embodiments, the backplate 702 defines an aperture 706 adapted to receive a shaft 710.

In some embodiments, an alternatively-shaped pocket box 704 disposes behind the nest 100 and/or the backplate 702. The pocket box 704 may be hexagonal and dimensioned to contour the surfaces 708 and vertices 714 of the next 100 and/or backplate 702.

A front plate 712 may, in various embodiment, position in front of the nest 100 and also be dimensioned to contour the nest's 100 hexagonal surfacing. The front plate 712 may, or may not, comprise bores or apertures 716. Each of the components 704, 702, 100, and 712 may be shaped as hexagonal, or octagonal, prisms as shown.

A cylindrical shaft 710 detachably inserts into the front plate 712 (or cover 712), the nest 100, the backplate 702 and the pocket box 704 in various embodiments. The cylindrical shaft 710 may be removed to separate the components of the assembly 700. The cylindrical shaft 710 may comprise a rod, tubular component, screw, elongated polymeric or metallic bolt, and the like.

The cover 712 without bores or apertures, may close forward access to the tubular cavities within the nest 100 to exclude chemical, pest, or other harmful intrusion.

Figure 8:
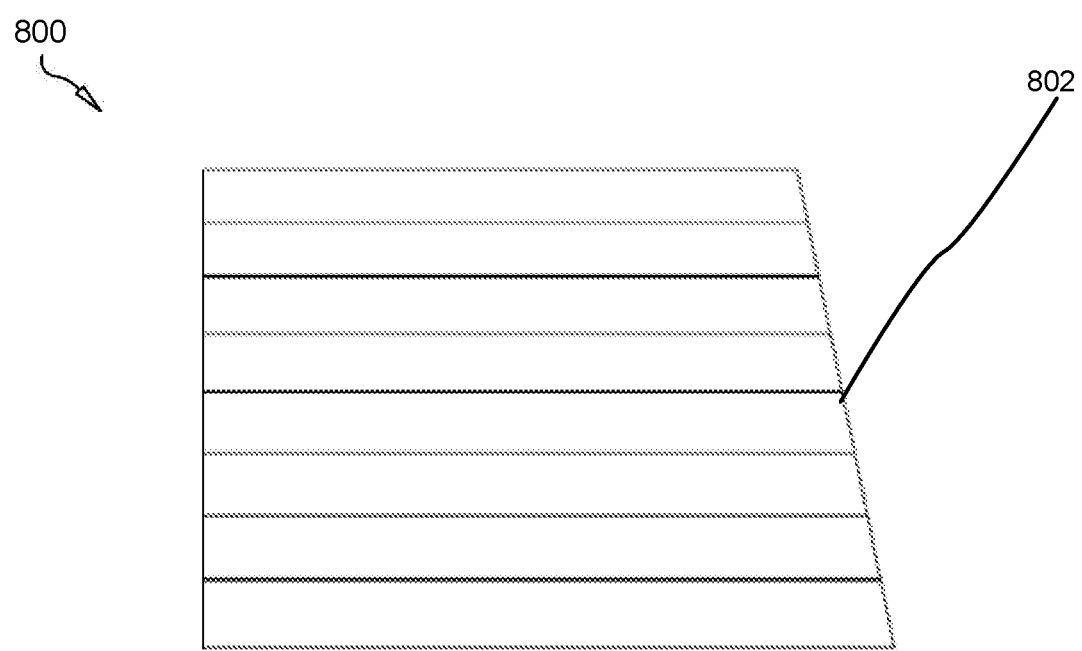
FIG. 8 illustrates a side view of a bee nesting block, according to an embodiment of the present invention.

FIG. 8 illustrates a side view of a bee nesting block 800, according to an embodiment of the present invention.

The bee nesting block 800 may have an inclined forward surface 802 as shown. In various embodiments, only a portion of the face of the block 800 is inclined 802 as shown and another portion of the face may be planar.

Figure 9:
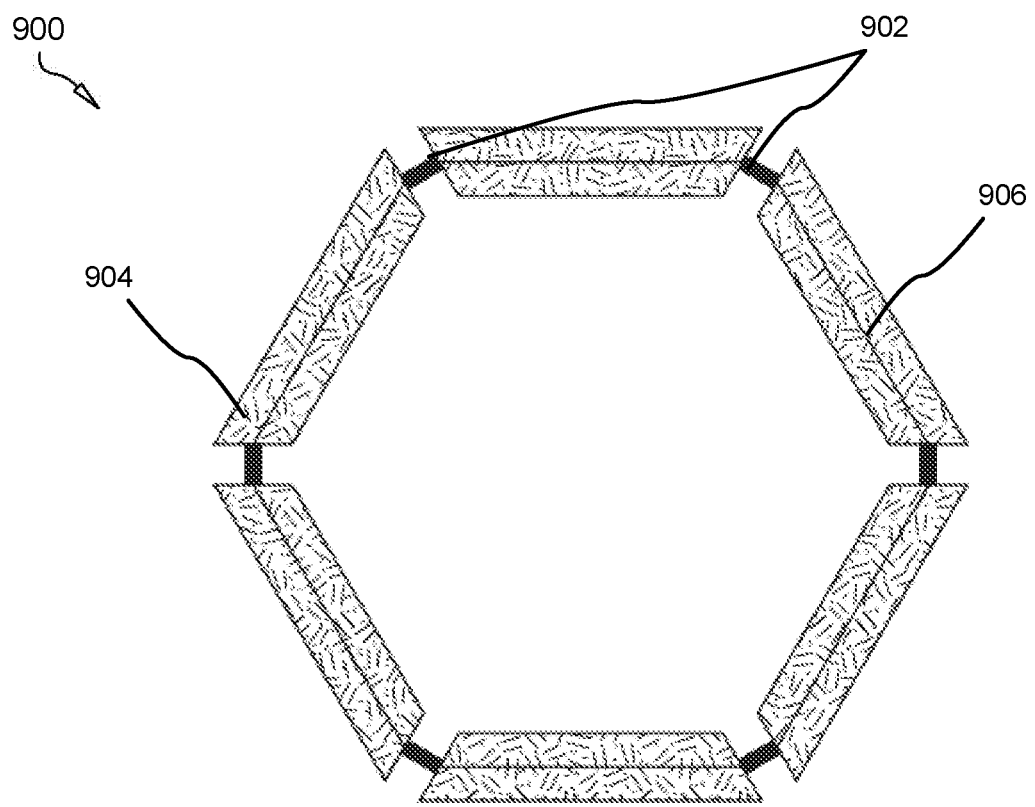
FIG. 9 illustrates a forward view of a bee nesting block, according to an embodiment of the present invention.

FIG. 9 illustrates a forward view of a bee nesting block 900, according to an embodiment of the present invention.

In the shown embodiment, a stretchable resin or polymeric band 902 circumscribes (or partially envelopes) the faces 904 of the block. In some embodiments, the band 902 envelopes a housing, or plurality of planar laminates, which also surround the block. The band 902 may be recessed as shown into a groove or track forming on an exterior surface of the block and also circumscribing the block. A plurality of bands 902 may incorporated into the block 900. The bands are adapted, in various embodiments, to inter alia allow the slabs 302 to expand and contract with moisture and/or temperature, as well as to permit human manipulation and inspection of the tubular cavities and/or status of the block 900. The groove, or track, indicated at 906, may be annular or hexagonal, and may be of uniform depth and width.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A hexagonal solitary bee nesting block comprising:
a plurality of slabs positioned one upon another to form a hexagonal shape from a forward perspective, each of the plurality of slabs defining a plurality of hemi-cylindrical cavities, wherein each hemi-cylindrical cavity mates with a corresponding hemi-cylindrical cavity on an adjoining slab of the plurality of slabs to form a tubular nesting cavity;
wherein each of the plurality of slabs defines one or more of a protuberance running with a z-axis and a track recess adapted to mate with a protuberance on an adjoining slab of the plurality of slabs;
wherein the plurality of slabs collectively form a plurality of rows of tubular nesting cavities, the rows of tubular nesting cavities including the tubular nesting cavity, wherein the tubular nesting cavities of the rows of tubular nesting cavities are staggered from one row to another;
wherein a length of each slab on a z-axis varies from a length of adjoining slabs of the plurality of slabs;
wherein the plurality of slabs are held together by tensile force from one or more circumscribing bands;
further comprising a porous backplate affixed behind the slabs, the porous backplate comprising a non-caustic material; and
a hexagonal pocket box positioned behind the porous backplate.

2. The hexagonal solitary bee nesting block of claim 1, further comprising a textured forward surface on a face of one or more slabs of the plurality of slabs.

3. The hexagonal solitary bee nesting block of claim 1, wherein the block is at least 4 inches in height and width measured from one of: a vertex to a diametrically-opposed vertex and a face to a diametrically-opposed face.

4. The hexagonal solitary bee nesting block of claim 1, wherein a face of the block is inclined such that a forward surface of every slab of the plurality of slabs is recessed behind a forward surface of an adjoining inferiorly-placed slab of the plurality of slabs.

5. The hexagonal solitary bee nesting block of claim 1, further comprising a detachable triangular cocoon storage box joined to the slabs, the triangular cocoon storage box adapted to house a plurality of cocooned hymenoptera extracted from the tubular nesting cavities.

6. The hexagonal solitary bee nesting block of claim 5, wherein the triangular cocoon storage box defines an open bore hole.

7. The hexagonal solitary bee nesting block of claim 6, wherein the triangular cocoon storage box further comprises a top flap hingedly connected which opens to expose an interior recess of the triangular cocoon storage box.

8. The hexagonal solitary bee nesting block of claim 1, wherein the block is rotated by 1 to 89 degrees relative to a ground surface to prevent accumulation of precipitation on any surface of the block.

9. The hexagonal solitary bee nesting block of claim 1, wherein the block is joined together with a plurality of adjoining blocks to form an assembly of blocks to maximize tubular cavities within an allotted space and strengthen the joined blocks.

10. The hexagonal solitary bee nesting block of claim 9, wherein the assembly of blocks is joined together using one or more circumscribing bands.

11. The hexagonal solitary bee nesting block of claim 1, further comprising a porous backplate affixed behind the slabs, the porous backplate comprising a non-caustic material.

* * * * *